Jan. 18, 1927.  
V. Z. CARACRISTI  
1,614,713  
FEEDER FOR POWDERED FUEL  
Filed Nov. 19, 1921
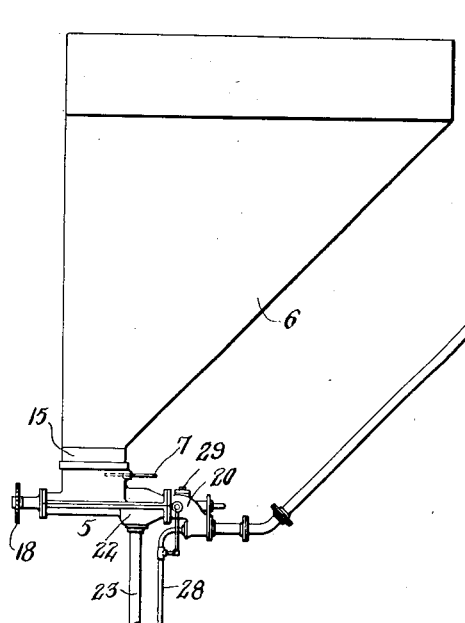
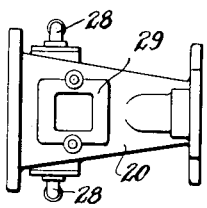
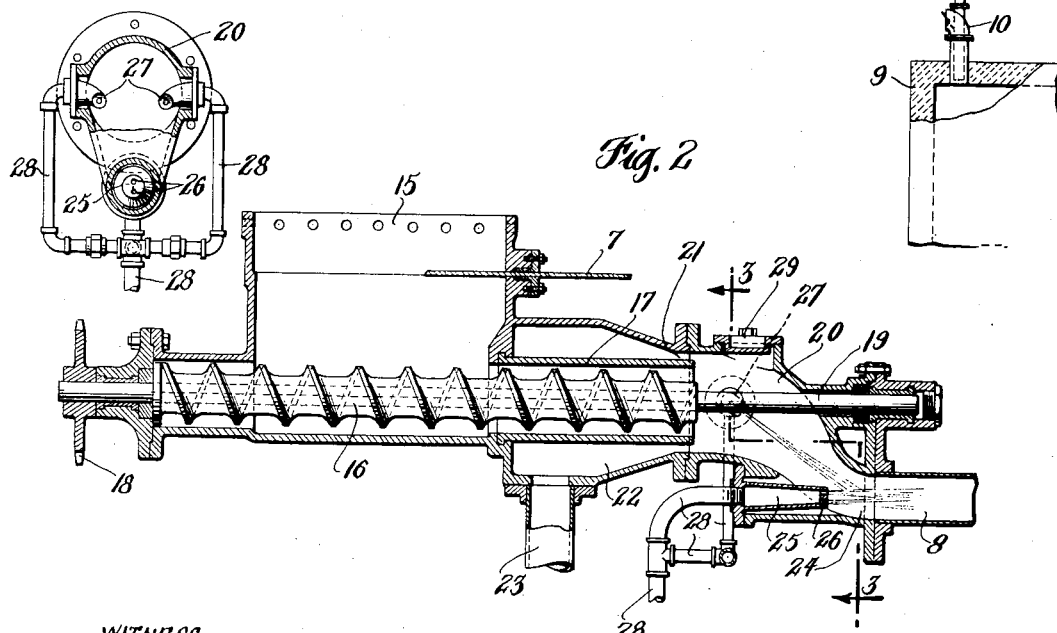
WITNESS.  
Gustav Genzlinger.
INVENTOR  
Virginius Z. Caracristi  
BY  
Synnestvedt & Lechner  
ATTORNEYS Patented Jan. 18, 1927.

1,614,713

UNITED STATES PATENT OFFICE.

VIRGINIUS Z. CARACRISTI, OF BRONXVILLE, NEW YORK, ASSIGNOR TO LOCOMOTIVE PULVERIZED FUEL COMPANY, A CORPORATION OF DELAWARE.

FEEDER FOR POWDERED FUEL.

Application filed November 19, 1921. Serial No. 516,295.

My invention relates to feeders for powdered fuel, and is more especially concerned with long distance delivery of such fuel, and with delivery against considerable gravitational heads. Besides simplicity and convenience of construction and operation, my invention has the advantage of easy applicability to ordinary types of pulverized fuel feeding apparatus. Still other advantages obtainable through my invention will be apparent from my description hereinafter of the best embodiment of the invention at present known to me.

In the drawings, Fig. 1 is a somewhat diagrammatic view of a fuel handling system embodying my type of feeder, partly in elevation and partly in vertical section.

Fig. 2 shows a vertical mid section through the feeder apparatus, on a larger scale than Fig. 1.

Fig. 3 shows a cross section through the feeder, taken as indicated by the line 3—3 in Fig. 2.

Fig. 4 is a plan view of a portion of the feeder apparatus.

In the system shown in Fig. 1, the feeder 5 receives powdered coal or other fuel by gravity from a bin 6 under control of an adjustable sliding gate 7, and delivers through a pipe line 8 of considerable length either to a furnace 9 if the fuel is to be immediately used or to a storage bin or receptacle in place of the furnace if the fuel is simply being transferred from one point to another for future use. As shown, the fuel is first conveyed to a considerable height (and hence against a correspondingly great head) through an inclined section of the pipe line, then carried along for some distance through a horizontal section, and finally allowed to drop by gravity, through a vertical section and a burner device 10, into the furnace 9.

The feeder 5 here shown resembles feeders of my so-called "split" type now in use, so that minute description thereof is unnecessary. It comprises a receiving chamber or hopper 15 into which the fuel falls by gravity from the bin 6, and positive mechanical feeding means in the form of a screw conveyor 16 in the bottom of the hopper 15, that feeds the fuel along to the right through a surrounding sleeve or conduit 17. The screw 16 may be driven at regulable speed from any suitable source of power by means of a sprocket wheel 18 on one end of its shaft 19. The conduit 17 serves as intake to a sort of mixing chamber 20 where in the present instance (as in my split type of feeder now in use) the pulverized fuel is mixed with and suspended in "carrying" air supplied the chamber 20 by means of an annular channel or nozzle 21 surrounding the intake 17. The annular supply channel 21 is itself the outlet of a chamber 22 surrounding the fuel intake 17, and supplied with air under moderately low pressure by a pipe 23.

The mixing chamber 20 here shown converges and slopes downward from the fuel intake 17 and the air supply means 21 toward a discharge opening 24 at its side opposite said intake and supply means 17 and 21, at a lower level. To this opening 24 is connected the delivery pipe or conduit 8. Through the sloping bottom of the chamber 20, beneath the intake means 17 and 21, an air-jet nozzle 25 (here shown with a plurality of small openings 26) is directed toward the discharge 24 and the pipe 8—or more accurately (in the present instance), almost directly into the discharge. Other smaller curved air jet nozzles 27, 27 (here shown with single small openings) extend into the mixing chamber 20 from either side and are directed diagonally downward toward the discharge 24. These nozzles 27, 27 are located at either side of the fuel intake 17 about on a level therewith—somewhat in front thereof, but behind the nozzle 25. Air under suitable pressure (preferably greater than required for the carrying air supplied at 21) is supplied to the air jet nozzles 25 and 27, 27 through a branching pipe line 28.

Convenient access to the interior of the chamber 20 is afforded by an opening in its top, normally closed by a cover 29 removably bolted to the chamber casting or casing.

In operation, the air issues from the nozzles 25, 27, 27 with high velocity, and serves (especially that from the nozzle 25) to impart to the mingled air and fuel from the intake means 17, 21 sufficient velocity to travel considerable distances and to overcome considerable adverse gravitational heads. The air jets or streams from the nozzles 27, 27 act, so to speak, as feeders or boosters to the jet or stream from the succeeding nozzle 25. Also, the convergence and intermingling of these different streams with one another at and near the discharge 24 creates eddies that produce agitation and thorough commixture of air and fuel. Such commixture is also promoted by the subdivision of the nozzle 25 and its stream or jet resulting from its multiplicity of orifices 26. In practice, the suspension of fine coal particles in air issuing from the pipe line 8 at the point of discharge present the appearance and behavior of a liquid, which on being collected and allowed to stand gradually shrinks in volume as the air disassociates itself from the coal. With Pennsylvania anthracite of a fineness of 85% through a 200 mesh screen, initially containing about 1% moisture, a 50% reduction in volume on standing ½ hour has been observed, the air pressure used at the nozzles 25, 27, 27 being about 85 pounds.

It is somewhat advantageous to make the screw 16 larger and of greater capacity per revolution than usual with this type of feeder, and to operate it at somewhat lower speed. It is also advantageous that the screw should feed the coal in greater amounts per revolution than is usual with such feeders, in order that the coal may be blown through the pipe in a relatively large stream. This reduces the air consumption and improves the efficiency, and also minimizes the loss by leakage at the vents of the bin 6, when the system is started. The screw 16 offers some resistance to such back flow of fuel and normally the air jets tend to draw a vacuum on the screw.

Under some circumstances, the supply of air in the chamber 22 may be cut off or dispensed with, and the feeder operated entirely on the air from the nozzles 25 and 27, 27. Also the apparatus may be operated without one or other of the latter sets of nozzles. The air line 23 and the line 28 and its branches may usually, of course, be provided with shut-off and control valves.

What I claim is:

1. A pulverized fuel feeder comprising a mixing chamber with powdered fuel intake at one side and a discharge outlet at a lower level at the other side, air jet nozzles located at the fuel intake side and directed into the discharge outlet and an air jet nozzle beneath and in front of the fuel intake also directed into said discharge outlet.

2. A pulverized fuel feeder comprising a mixing chamber with powdered fuel intake and surrounding air supply means at one side and a discharge outlet at a lower level at the other side; air jet nozzles located at the fuel intake and an air jet nozzle located at the discharge outlet arranged so that the streams from said nozzles converge at the discharge outlet and are directed thereinto.

3. A pulverized fuel feeder comprising a mixing chamber with powdered fuel intake at one side and discharge outlet at a lower level at the other side; an air jet nozzle beneath said intake directed into said discharge outlet; and air jet nozzle means at the sides of said intake arranged to direct converging air jets of high velocity toward the discharge outlet.

4. A pulverized fuel feeder comprising a mixing chamber having powdered fuel intake at one side and converging and sloping downward toward a discharge at a lower level at the other side; an air jet nozzle directed through the sloping bottom of said chamber toward said discharge; and air jet nozzles at the sides of said intake directed downward toward said discharge.

In testimony whereof, I have hereunto signed by name.

VIRGINIUS Z. CARACRISTI.